United States Patent Office 3,729,331
Patented Apr. 24, 1973

3,729,331
PROCESS FOR REFLOWING ORGANIC SURFACES
Thomas A. Vivian, Midland, Mich., assignor to The Dow Chemical Company, Midland, Mich.
No Drawing. Application Dec. 1, 1969, Ser. No. 881,284, now Patent No. 3,663,255, which is a continuation-in-part of abandoned application Ser. No. 844,662, July 24, 1969. Divided and this application Mar. 25, 1971, Ser. No. 128,175
Int. Cl. B23p 7/00; B29c 25/00
U.S. Cl. 117—2 R
2 Claims

ABSTRACT OF THE DISCLOSURE

Composition for reflowing organic surfaces, such as paints and polystyrene, have been discovered which contains by volume 50 to 90% of a liquid chlorinated aliphatic hydrocarbon, 5 to 30% of a liquid ketone or alcohol, 2 to 20% of a glycol ether alkanoate and 0 to 30% of an alkyl alkanoate, all of such components having a boiling point below 200° C.

CROSS-REFERENCE TO RELATED APPLICATIONS

The present application is a division of Ser. No. 881,-284 filed Dec. 1, 1969, now U.S. Pat. No. 3,663,255, issued May 16, 1972, which in turn was a continuation-in-part of my prior application Ser. No. 844,662 filed July 24, 1969, now abandoned.

BACKGROUND OF THE INVENTION

Although various solvents have been used to reflow thermoplastic organic surfaces, heat treatment has been the primary technique used to reflow such surfaces. Of the solvents, chlorinated hydrocarbons are especially effective reflow agents. The greatest drawback to the commercial use of chlorinated solvents on pigmented organic materials, however, has been the marked discoloration encountered when these solvents are employed. This discoloration is especially troublesome when methylene chloride is used to reflow metallized paints. Also, in reflowing thermoplastic surfaces, crazing and bloom-back are encountered in addition to discoloration.

SUMMARY OF THE INVENTION

According to the present invention, reflow compositions containing by volume 50 to 90% of a liquid chlorinated aliphatic hydrocarbon, 5 to 30% of a ketone or alcohol, 2 to 20% of a glycol ether alkanoate and 0 to 30% of an alkyl alkanoate, all of such components having a boling point below 200° C., have been found to be especially effective reflow agents for thermoplastic organic surfaces such as paint.

Organic surfaces are easily reflowed by the compositions of the present invention by applying the composition to the surface in the form of a liquid by means of a fine spray, or preferably by vaporizing the composition and contacting the surface with a vapor at an elevated temperature. During reflow, the organic surface becomes fluid and is mobilized to form an essentially uniform coat over the supporting body. After reflow, the organic surface dries as the solvent is evaporated under its own vapor pressure at ambient conditions or by heating the reflowed surface. The dried surface forms an essentially identical surface to that of the surrounding area. Thus, by localized reflow, minor imperfections in a small area of an organic surface may be removed without creating noticeable distortions in the color or other characteristics of the total surface. Alternatively, the whole surface may be reflowed to improve gloss in lieu of buffing.

The chlorinated aliphatic hydrocarbon of the composition of the invention may suitably be any normally liquid chlorinated hydrocarbon that is a partial solvent for the organic surface. These chlorinated hydrocarbons suitably have 1 to 6 or more carbon atoms and a boiling point of less than 200° C. at atmospheric pressure. Although the hydrocarbon backbone may vary widely, best results have been obtained with 2 to 6 or more chlorine atoms per molecule. According to these general limitations, representative compounds of the present invention include: the chlorinated alkanes such as methylene chloride, chloroform, 1,1- and 1,2-dichloroethane, 1,1,1- and 1,1,2-trichloroethane, the various trichloropropanes, tetrachloropropanes, tetrachlorobutanes, hexachlorobutanes, dichloropentanes and trichlorohexanes; and the chlorinated alkenes such as 1,2-cis- and trans-dichloroethylene, trichloroethylene, tetrachloroethylene, the trichloropropenes, tetrachlorobutenes. In the preferred composition of the present invention, the chlorinated aliphatic component is a chlorinated alkane or alkene of 1 to 3 carbon atoms with methylene chloride, 1,2-cis- or trans-dichloroethylene, trichloroethylene and tetrachloroethylene being of special interest. Of greatest importance in the present invention is methylene chloride.

Although the chlorinated aliphatic hydrocarbon may comprise 50 to 90% by volume of the composition of the present invention, composition containing 60 to 80% of the chlorinated hydrocarbon are preferred. The chlorinated hydrocarbon may also be stabilized against metal reduction with minor amounts of various stabilizers such as propylene oxide, butylene oxide, dimethoxymethane or other suitable stabilizers. The use of such stabilizers is preferred when methylene chloride is the chlorinated aliphatic hydrocarbon.

The second component of the reflow composition of the present invention is a ketone or alcohol which may comprise 5 to 30% by weight of the reflow composition. Such ketones and alcohols are normally liquid at room temperature and have a boiling point of about 50° to about 200° C. at atmospheric pressure. Dialkyl ketones and alkanols are preferred in the present invention. Representative examples of such ketones and alcohols include: ketones having up to about 11 carbon atoms, such as acetone, methyl ethyl ketone, diethyl ketone, methyl propyl ketone, methyl isobutyl ketone, ethyl amyl ketone, di-n-butyl ketone, allyl ethyl ketone, acetyl acetone and methyl hexyl ketone; and alcohols containing up to about 8 carbon atoms such as methanol, ethanol, propanol, isopropanol, n-butanol, 2-butanol, pentanol, hexanol, octanol and allyl alcohol. Of these ketones and alcohols, acetone, methyl ethyl ketone, methyl isobutyl ketone and butanol are preferred. Although the concentration of the ketone and alcohol may range from about 5 to about 30 volume percent, concentrations of about 10 to about 25 volume percent are preferred.

The third component of the present invention is a glycol ether alkanoate. Such glycol ether esters have one of the terminal hydroxyls capped with an alkyl ether group and the other hydroxyl capped with an acyl group and may be prepared by reacting a glycol according to ordinary etherification and esterification reactions. Preferred glycol ether esters boil at about 140° to about 200° C. Representative examples of suitable glycol ether esters include: ethylene glycol ether esters, such as ethylene glycol ethyl ether acetate, ethylene glycol butyl ether acetate, ethylene glycol methyl ether acetate, ethylene glycol methyl ether propionate, ethylene glycol propyl ether acetate, and ethylene glycol methyl ether butyrate; propylene glycol ether esters, such as propylene glycol ethyl ether acetate, propylene glycol methyl ether acetate, propylene glycol propyl ether acetate, propylene glycol methyl ether propionate, propylene glycol methyl ether butyrate and propylene glycol butyl ether acetate; and butylene glycol ether esters such as butylene glycol ethyl ether acetate, butylene glycol methyl ether acetate, butylene glycol ethyl ether butyrate and butylene glycol butyl ether acetate. Preferred lower alkylene glycol ether esters have an alkyl ether group of 1 to 4 carbon atoms and an acyl group of 2 to 5 carbon atoms. Also preferred in the present invention are the glycol ether esters of ethylene glycol. Especially preferred in the present invention is the use of ethylene glycol ethyl ether acetate. Although the glycol ether acetate amy be present in amounts of about 2 to about 20% by volume, compositions containing about 5 to about 15% by volume of the glycol ether ester are preferred.

The fourth and optional component of the present invention is an alkyl alkanoate. Suitable esters of the present invention have a boiling point of about 50° to about 200° C. and contain about 3 to about 10 or more carbon atoms. Representative examples of such esters include methyl acetate, ethyl acetate, butyl acetate, hexyl acetate, ethyl propionate, ethyl butanoate, propyl hexanoate and butyl propionate. The use of butyl acetate as the ester is preferred especially when organic surfaces having a temperature of about 30° C. are reflowed. As the temperature of the organic surface is increased, the alkyl ester of the composition is preferably replaced by the glycol ether ester which is more effective for high temperature applications.

The compositions of the present invention are simply prepared by mixing the individual components in the proportions described above. The reflowing compositions of the present invention may suitably be applied to any organic surface that is at least partially soluble in the reflow composition to remove minor imperfections from localized areas or from the entire surface. The particular reflow composition may vary widely as different organic surfaces and terminal characteristics are desired. Of the various organic surfaces that may be reflowed by the compositions of the present invention, paints including lacquers and enamels, thermoplastic resins, such as polystyrene, polybutadiene, acrylonitrile-butadiene-styrene and similar substances, are preferred, with the reflow of paint being of particular interest.

With the compositions of the present invention, minor imperfections are conveniently and effectively removed from a thermoplastic organic surface by applying a reflow composition of the invention to the surface under conditions which allow for rapid vaporization of the reflow solvent. Generally, the reflow compositions of the invention are volatile enough to be removed under normal room conditions, but some may require heating or other technique to increase the rate of evaporation.

SPECIFIC EMBODIMENTS

Examples 1-4

Four pieces of steel measuring 12″ x 6″ were completely painted on one side with aluminized acrylic lacquer and dried. With a coarse piece of sandpaper, a 3″ wide scratched area was made in the paint along one side. Masking tape was then applied to partially cover the scratched and unscratched painted area. Various compositions of the invention were then vaporized and hot vapors were contacted with the individual test sections to reflow the exposed paint. The test sections were allowed to dry, the mask was removed and the appearance of the reflowed areas was examined in comparison to the part of the metal sheet covered by the masking tape during the solvent reflow operation. The discoloration, characteristics of the reflowed surface and subsequent blistering under high humidity conditions were tested. The blistering experiments were conducted by placing the reflowed metal plate in a chamber at 100% relative humidity and 95°–140° F. for a period of four days shortly after the painted surface had been reflowed and then observing the surface for blistering. The examples were run under room temperature conditions, about 75° F., and also under high temperature conditions, about 140° F. In each example, the paint was reflowed, minor scratches in the surface were removed, a glossy surface resulted and no blistering was encountered. The compositions and results of the discoloration observations are shown in Table I.

TABLE I.—REFLOW OF ALUMINIZED ACRYLIC LACQUER

| Composition, weight percent | Discoloration 70° F. | Discoloration 140° F. |
| --- | --- | --- |
| Example 1: | | |
| 70% methylene chloride [1] | Faint dull haze. Very little discoloration | No haze. No discoloration. |
| 20% methyl ethyl ketone | do | Do. |
| 10% ethylene glycol ethyl ether acetate | do | Do. |
| Example 2: | | |
| 70% methylene chloride [1] | Very faint haze. Very little discoloration | No haze. Very faint discoloration. |
| 20% acetone | do | Do. |
| 10% ethylene glycol ethyl ether acetate | do | Do. |
| Example 3: | | |
| 70% methylene chloride [1] | Faint haze. Very little discoloration | Very faint haze. Very little discoloration. |
| 20% methyl ethyl ketone | do | Do. |
| 5% ethylene glycol ethyl ether acetate | do | Do. |
| 5% butyl acetate | do | Do. |
| Example 4: | | |
| 70% methylene chloride [1] | Faint haze. Little discoloration | Faint haze. Little discoloration. |
| 20% acetone | do | Do. |
| 5% ethylene glycol ethyl ether acetate | do | Do |
| 5% butyl acetate | do | Do, |

[1] Containing 0.5% by weight propylene oxide.

Also in the same manner as described by the examples above, compositions containing 50 to 90% by weight of methylene chloride, 5 to 30% by weight methyl ethyl ketone or acetone, 2 to 20% by weight of ethylene glycol ethyl ether acetate may be employed to vapor reflow thermoplastic acrylic lacquer paints and thermoplastic polymers, such as polystyrene and polybutadiene.

Also in the same manner, other compositions containing by volume 50 to 90% of a liquid aliphatic chlorinated hydrocarbon, 5 to 30% of a ketone or alcohol, 2 to 20% of a glycol ether ester and 0 to 30% of an alkyl ester may be employed as a solvent in the vapor reflow of the organic surfaces above. Representative examples of such compositions include compositions containing 5% n-butanol, 30% propyl acetate, 5% ethylene glycol methyl ether acetate and 60% trichloroethylene; 30% dipropyl ketone, 20% propylene glycol propyl ether acetate and 50% perchloroethylene; and 10% hexanol, 10% butylene glycol ethyl ether propionate and 80% methylene chloride.

I claim:

1. The process for reflowing a thermoplastic organic surface comprising contacting a composition consisting of the following components:
    50–90% by volume of a liquid chlorinated aliphatic hydrocarbon selected from the group consisting of chlorinated alkanes and alkenes having one to three carbon atoms and mixtures thereof,
    5–30% by volume of a dialkyl of up to 11 carbons,
    2–20% by volume of a lower alkylene glycol ether alkanoate having an alkyl ether moiety of one to four carbons and an acyl moiety of two to five carbons, and 0–30% by volume of an alkyl alkanoate, all of such components having a boiling point below 200° C., with the surface under conditions which allow for rapid vaporization of the composition.

2. The process of claim 1 wherein the thermoplastic organic surface is paint and said composition is directed against said paint as a fine spray at an elevated temperature.

References Cited

UNITED STATES PATENTS

| | | | |
|---|---|---|---|
| 3,379,549 | 4/1968 | Playfair | 117—2 X |
| 3,437,727 | 4/1969 | Boyhan et al. | 264—341 |
| 3,443,008 | 5/1969 | Boyhan et al. | 117—63 X |
| 2,294,479 | 9/1942 | Peter | 117—63 |
| 3,339,526 | 9/1967 | Bradley et al. | 117—63 X |
| 3,620,806 | 11/1971 | Kohne et al. | 117—63 |
| 3,565,665 | 2/1971 | Stranch et al. | 117—63 X |
| 3,105,769 | 10/1963 | Ellerin | 117—2 |
| 3,020,661 | 2/1962 | Miller et al. | 264—341 |
| 1,557,520 | 10/1925 | Ellis | 252—171 |
| 2,969,328 | 1/1961 | Ellenson | 252—171 |
| 2,999,816 | 9/1961 | Bennett | 252—171 |

FOREIGN PATENTS

| | | | |
|---|---|---|---|
| 1,546,997 | 1/1970 | Germany | 117—2 |
| 773,632 | 5/1957 | Great Britain | 252—171 |
| 302,390 | 12/1928 | Great Britain | 106—190 |

OTHER REFERENCES

Def. Pub., O. G. Def. Pub., Holt, Ser. No. 867,969, filed Oct. 20, 1969, continuation of Ser. No. 684,537, filed Nov. 20, 1967, published in 872 OG 1411, Nov. 30, 1970, No. T872,012.

WILLIAM D. MARTIN, Primary Examiner

H. J. GWINNELL, Assistant Examiner

U.S. Cl. X.R.

117—63; 156—2; 264—341